Dec. 13, 1966 R. A. ROQUES 3,292,130

RESISTOR

Filed July 28, 1961 2 Sheets-Sheet 1

FIG. I.

INVENTOR
Rodney A. Roques

BY
Stevens, Davis, Miller & Mosher
ATTORNEYS

INVENTOR
Rodney A. Roques

BY
Stevens, Davis, Miller & Mosher
ATTORNEYS

United States Patent Office 3,292,130

Patented Dec. 13, 1966

3,292,130

RESISTOR

Rodney A. Roques, Richardson, Tex., assignor to Texas Instruments Incorporated, Dallas, Tex., a corporation of Delaware Filed July 28, 1961, Ser. No. 127,691

5 Claims. (Cl. 338—308)

This invention relates to a method of fabricating film resistors and to resistors produced by the use of the method.

Since the advent of the transistor and other semiconductor elements, great progress has been made in miniaturizing electrical components to reduce their cost by an economy of materials and to reduce their size to conserve space. As one such component, the resistor has undergone considerable development in this direction, particularly resistors of the film type in which a film of metal or carbon is deposited on an insulating support to form the resistor.

One object of this invention is a film resistor of which the film is a semiconductor material suitably doped with conductivity determining impurities, the thickness of the film and the amount of impurity therein being controllable to impart some or all of the properties required of a resistor, for example, desirable temperature coefficient of resistance, absolute resistance, close tolerances and high or low resistivity.

Another object of the invention is a method by which such a resistor may be produced.

Other objects, advantages and features of this invention will become apparent from the following detailed description, taken in conjunction with the appended claims and the accompanying drawings, in which:

Figure 1:
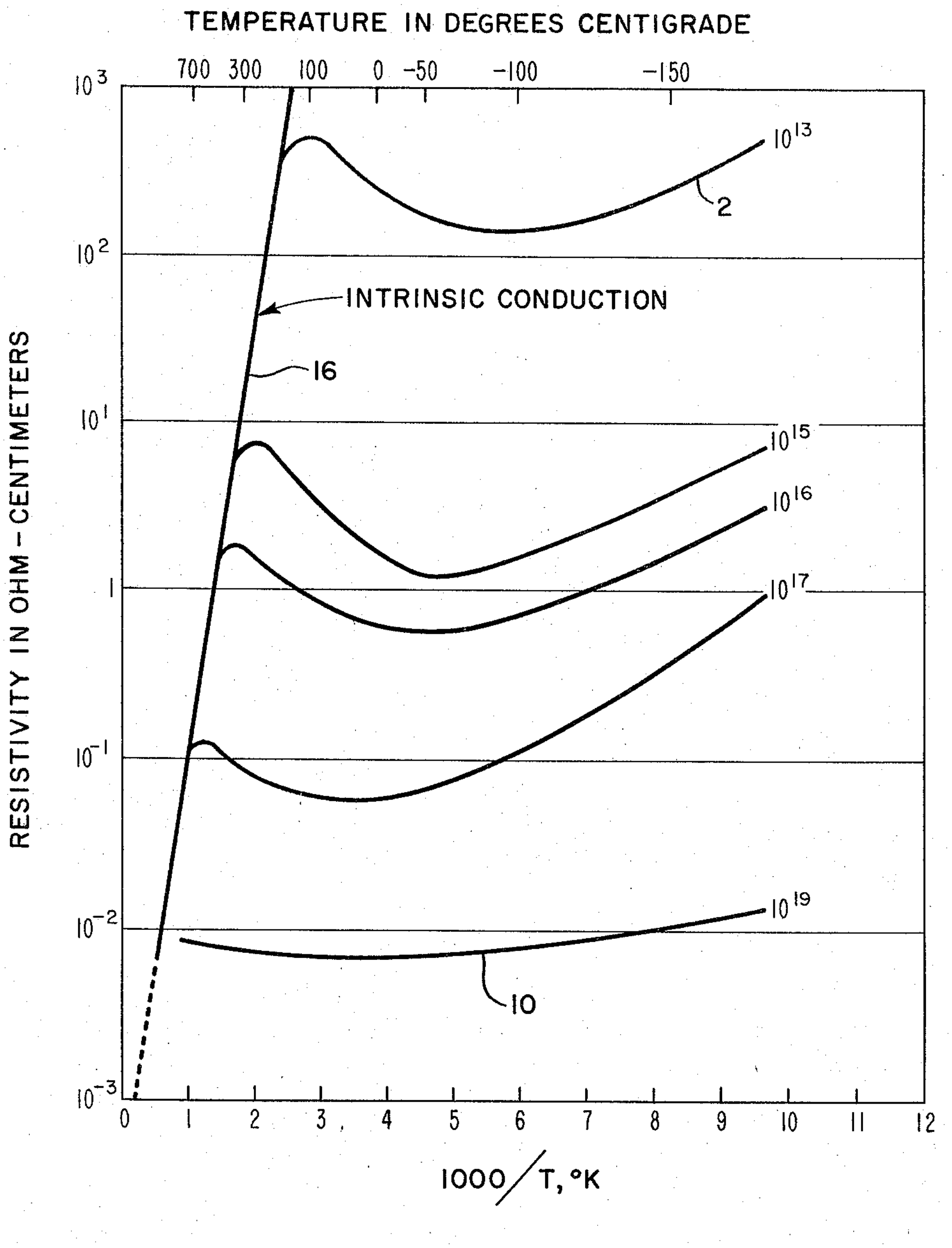
FIGURE 1 is a graphical representation of the electrical resistivity of boron doped silicon for several boron concentrations, plotted against temperature.

Referring to FIGURE 1 of the drawings, there is shown on a logarithmic scale the electrical resistivity of silicon doped boron for several boron concentrations, plotted against temperature. Numeral 16 represents the locus at which the electrical conduction of silicon becomes intrinsic for various boron concentrations. (Intrinsic conduction for a semiconductor is defined, for purposes of this application, to be the electrical conduction of the semiconductor that is due primarily to the inherent properties thereof. This state of conduction is usually attained by heating the semiconductor to a temperature of which further increase thereof has the effect of increasing the electrical conductivity of the semiconductor by exciting electrons in the atoms comprising the crystal lattice from the valence band to the conduction band.) Numeral 2 represents the temperature versus resistivity curve of silicon containing about $10^{13}$ boron atoms per cubic centimeter. In contrast with this is the temperature versus resistivity curve 10 of silicon that contains about $10^{19}$ boron atoms per cubic centimeter, the silicon having a sufficient density of boron atoms therein to cause the silicon to approach a condition whereby a further addition of impurities has little or no effect on the electrical conduction of the sample. It may be noted from curve 10 that the electrical resistivity of silicon approaches a minimum variation with temperature as the silicon approaches this condition. Thus it is advantageous to utilize silicon having a high density of boron atoms to achieve a low temperature coefficient of resistance.

Semiconductors other than silicon may be chosen for the production of film resistors since the general tenor of the curves shown in the FIGURE 1 is characteristic of most semiconductors, for example, germanium, indium antimonide, etc. Moreover, impurities other than boron, both p- and n-type, have the same effect in semiconductors for the purposes of the present invention.

To provide a resistor having the aforementioned advantages, a thin film of silicon of predetermined thickness is deposited on a suitable insulating member such as ceramic or glass. Spaced apart electrical contacts are made to the resistance film to complete the device.

Any one of several methods may be used to deposit films on insulating members. For example, an amount of silicon containing an appropriate amount of impurities can be evaporated onto an insulating plate. As a preferred method, however, pyrolytically depositing silicon onto an insulating member from a silicon halide in the presence of hydrogen gives very desirable results. The film thickness can be adjusted to whatever value desired, the impurities being added to the silicon film during the depositing thereof.

Figure 2:
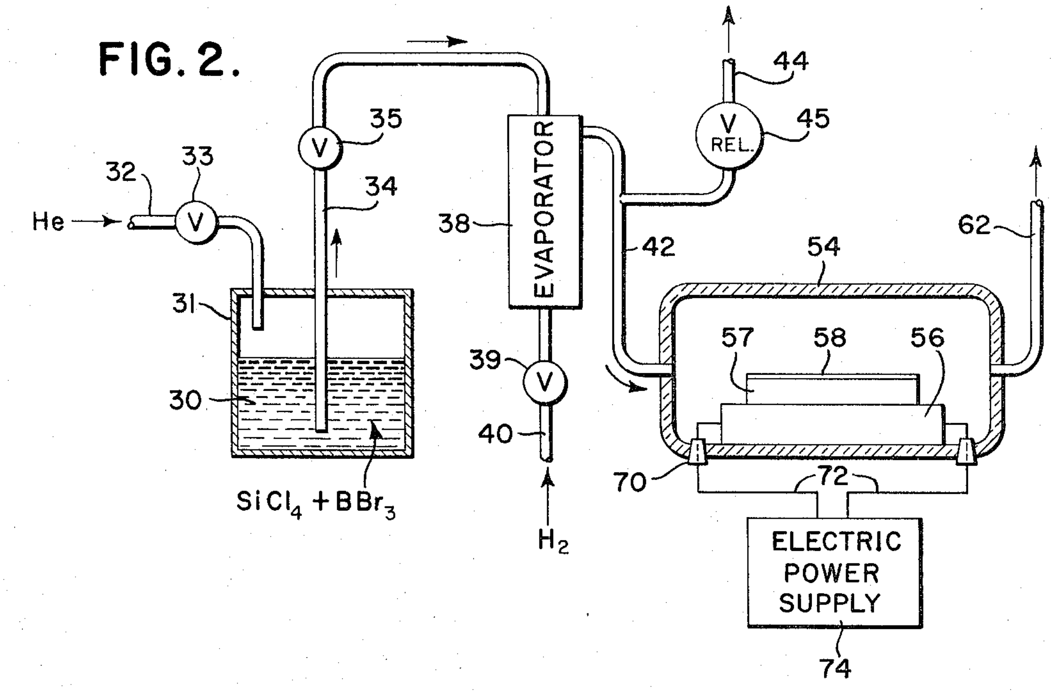
FIGURE 2 is a schematic flow diagram of an apparatus illustrating one method for depositing a thin film of a semiconductor material on an insulating support.

FIGURE 2 diagrammatically illustrates an apparatus for pyrolytically depositing a silicon film, containing an appropriate amount of impurities therein, on an insulating plate. A valve 39 allows hydrogen to pass from inlet 40 to an evaporation chamber 38. A source 30 of liquid silicon tetrachloride ($SiCl_4$), mixed with liquid boron tribromide ($BBr_3$), is contained in vessel 31. A flow of inert gas, such as helium, into vessel 31 is provided by a source 32 through valve 33. An outlet 34 and valve 35 provide for the mixture of $SiCl_4$ and $BBr_3$ to pass from the vessel 31 to evaporator 38. Hydrogen, flowing through evaporation chamber 38, totally evaporates the mixture of $SiCl_4$ and $BBr_3$ present in the evaporator 38. A flow line 42 allows the evaporated $SiCl_4$-$BBr_3$ mixture and hydrogen to pass into a quartz reaction furnace 54. An excess pressure line 44 and valve 45 are provided in flow line 42. A vent 62 is provided at one end of furnace 52 to remove excess gasses.

As one example for pyrolytically depositing a silicon film on an insulating plate, a 96% alumina ceramic plate 57, manufactured by the American Lava Company and having dimensions of 1 inch by 0.5 inch by 0.01 inch, is placed on a carbon filament heater 56 within the quartz reaction tube 54, as shown in FIGURE 2. The ceramic plate 57 is heated to about 1050° C. by an electric current passing through the carbon heater 56, the electric current being provided by power supply 74 through wires 72. The wires 72 are passed through the walls of the quartz tube 54 by any suitable means, such as the hermetic seal 70.

Hydrogen, flowing at a rate of about 4.8 liters per minute, is passed through evaporator 38, flow line 42, and into the reaction furnace 54. The hydrogen is passed over the heated ceramic plate for about 3 to 5 minutes to clean its surface, the hydrogen passing out through vent 62. During this time valve 35 remains closed so that only hydrogen enters the reaction furnace 54. After the cleaning process is completed, valve 35 is opened to permit a flow of the $SiCl_4$-$BBr_3$ mixture into the evaporator 38. This flow is accomplished by maintaining a suitable pressure of inert gas, such as helium, from source 32 through valve 33 into the vessel 31.

A solution of 0.27 percent by volume of $BBr_3$ in $SiCl_4$ is passed into evaporator 38 by flow line 34 and valve 35 at a rate of about 1.6 cubic centimeters per minute. Hydrogen, flowing at the above-noted rate of about 4.8 liters per minute, totally evaporates the $SiCl_4$-$BBr_3$ mixture and carries the mixture through flow line 42 into reaction chamber 54 where it passes over the surface of the heated ceramic plate 57. The $SiCl_4$-$BBr_3$ mixture, carried by the hydrogen, is passed over the ceramic plate 57 for about 15 minutes. A thin film 58 of silicon, containing boron as an impurity, is thereby deposited thereon. After the deposition is completed, the $SiCl_4$-$BBr_3$ mixture is turned off by valve 35, and the temperature of the ceramic plate is gradually reduced to room temperature in the presence of the flowing hydrogen by reducing the electric current through the carbon filament by about 5 percent of the maximum current every minute. The gradual reduction of the temperature prevents thermal stresses from breaking the film and ceramic plate 57. As a result of the foregoing process, a film of thickness of about 0.4 mil is deposited on the ceramic plate. The silicon film, deposited according to the foregoing process, is polycrystalline, is of very fine grain, is smooth, and is very well bonded to the ceramic plate.

It should be noted that the foregoing pyrolytic process for providing a thin semiconductor film on an insulating plate has many advantages, some of which are the following. The process is adaptable to any semiconductor material and any impurity combined therewith. The temperature of the ceramic plate 57 may be adjusted to a higher or lower value so that a shorter or longer reaction time may be used to provide a film of equal thickness. The semiconductor impurity mixture may be passed through the reaction furnace 54 for a longer or shorter time, thus providing a correspondingly thicker or thinner film 58. A greater or lesser percent by volume, or weight, of impurity may be added to the semiconductor mixture, thus providing a semiconductor film 58 having a correspondingly lower or higher electrical resistivity. The variables thus enhance the process of adjusting the ultimate characteristics of the resistors as desired.

The characteristics of five resistance films made according to the foregoing process are shown in Table I. The function, surface resistivity in ohms per square, is used as a quantitative measure of the electrical resistivity where the thickness of the film cannot easily be measured, and is defined as follows.

$R=\rho L/wt,$
$t$=thickness of the film,
$w$=width of the film,
$L$=length of the film,
$\rho$=specific electrical resistivity of the film, and
$R$=total resistance of a film of length L and an area $wt$.

Thus, $$\rho/t=\frac{R}{L/w}=\text{surface resistivity in ohms per square}$$

TABLE I

| Film | Approximate thickness $t$, in Mil | $L$, in Inches | $w$, in Inches | $\rho/t$ in Ohms/square | Temperature Coefficient of Resistance in p.p.m./° C. | (Calculated) $\rho$ in Ohm-cm. | $R$, in Ohms |
|---|---|---|---|---|---|---|---|
| I | 0.4 | 1 | 0.5 | 70 | 130 | 0.071 | 140 |
| II | 0.4 | 1 | 0.5 | 45 | 180 | 0.046 | 90 |
| III | 0.4 | 1 | 0.5 | 90 | 240 | 0.091 | 180 |
| IV | 0.4 | 1 | 0.5 | 34 | 370 | 0.035 | 68 |
| V | 0.4 | 1 | 0.5 | 980 | 420 | 0.996 | 1,960 |

From Table I, it may be seen that silicon films can be produced with a very low temperature coefficient of resistance and a fairly high specific electrical resistivity. If the temperature coefficient of resistance is allowed to increase by reducing the density of impurities in the silicon, a much higher specific electrical resistivity can be achieved. By controlling the density of impurity in the silicon, a resistor can be made that has a low temperature coefficient of resistance and a higher specific electrical resistivity.

To illustrate how silicon film resistors compare to carbon and metal film resistors, reference is made to Table II showing the ranges of specific electrical resistivity, surface resistivity, film thickness and temperature coefficient of resistance for the films of each.

TABLE II

| | Silicon | Carbon | Metal |
|---|---|---|---|
| Specific Electrical Resistivity (ohm-cm.) | $10^{-1}$ to $10^{-3}$ | $10^{-2}$ to $10^{-3}$ | $10^{-4}$ to $10^{-6}$ |
| Surface Resistivity (ohms/square) | $10^1$ to $10^3$ | $10^1$ to $10^4$ | $10^1$ to $10^3$ |
| Film Thickness (A.) | $10^4$ to $10^5$ | $10^2$ to $10^4$ | $10^2$ to $10^3$ |
| Temperature Coefficient (p.p.m./° C.) | 125–400 | 200–500 | 25–50 |

Table II shows that the temperature coefficients of resistance of the silicon film resistors of the present invention are as low, or lower, than those of carbon film resistors while the specific electrical resistivities of the silicon film resistors are as high as those of carbon film resistors, being much higher than those for metal film resistors. The thickness of the silicon films can be made much greater than those of either the carbon or metal film resistors, and yet attain as high a resistivity and as low a temperature coefficient of resistance as those for a carbon film. This means that fabrication yields, percentage-wise, are much greater for silicon film resistors than for either carbon or metal film resistors since irregularities of either the insulating support surface or resistance films do not as appreciably affect the ultimate resistance of the film.

Figure 3:
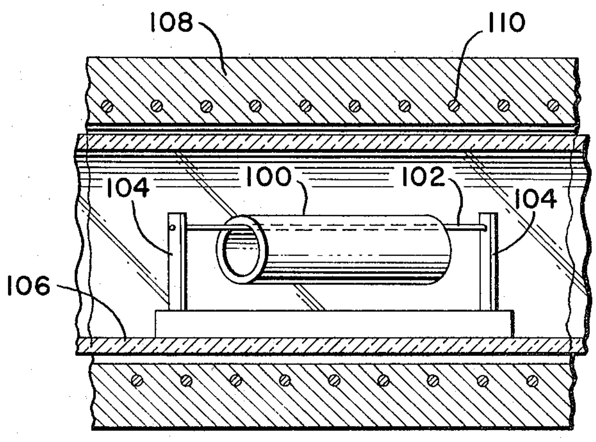
FIGURE 3 is a sectional view of a reaction furnace used in the practice of making one embodiment of the present invention.

Insulating supports other than flat plates can be used as the depositing support for the resistance films. For example cylindrical insulating cores (either hollow or solid) can be suspended in the reaction furnace by a metal wire passing through a hole in the core. As shown in FIGURE 3, a hollow ceramic core 100 is suspended by a wire 102 strung from supports 104. The assembly is placed in the quartz tube 106 which is surrounded by the cylindrical furnace 108. An electrical current passes through wire winding 110 of the furnace 108 to heat the core 100 within the quartz tube 106. The method for depositing a resistance film on the surface of the ceramic core 100 is the same as described in connection with the ceramic plate 57 of FIGURE 2. After the resistor element has been produced according to the foregoing method, suitable spaced-apart electrical terminals (not shown) for connecting the resistor as a component of an electric circuit, may be attached to the resistance layer by any of the well known methods available in the art.

Although a silicon film containing boron as an impurity (boron being a p-type conductivity impurity in semiconductors) has been described as a specific embodiment of this invention, other impurities, either p- or n-type, may be used in silicon. Moreover, reference to a graphical representation of the electrical resistivity of germanium as a function of temperature for different impurity concentrations shows that excellent film resistors can be made by pyrolytically depositing germanium on electrical insulating members. In fact, the present invention is applicable to any semiconductor exhibting similar characteristics as shown for silicon in FIGURE 1 of the drawing. Insulating supports of many sizes and shapes may be used as the depositing surface for the resistance films. Although a ceramic insulating support is used in the detailed description of the invention, glass will equally suffice as the insulating support, as will other suitable insulating materials. Thus the invention is intended to be limited only by the appended claims.

What is claimed is:

1. A resistance element comprising an electrical insulating member, a film of silicon deposited on said member, said silicon containing about $10^{18}$ to about $10^{20}$ conductivity determining impurity atoms per cubic centimeter, and spaced apart electrical connections to said film.

2. The resistance element as defined in claim 1 wherein said impurity atoms are boron.

3. A resistance element comprising an electrical insulating member selected from the group consisting of ceramic and glass, a film of silicon deposited on said member, said silicon containing about $10^{18}$ to about $10^{20}$ boron atoms per cubic centimeter, and spaced apart electrical connections to said film.

4. A resistance element comprising an electrical insulating member, a film of silicon semiconductor material deposited on said member, said material containing a sufficient concentration of a conductivity determining impurity to impart a substantially maximum conduction characteristic to said material at room temperature, and spaced apart electrical connections to said film.

5. A resistance element according to claim 4 wherein said impurity is boron.

References Cited by the Examiner

UNITED STATES PATENTS

| | | | |
|---|---|---|---|
| 2,778,743 | 1/1957 | Bowman | 117—46 |
| 2,784,121 | 3/1957 | Fuller | 148—189 |
| 2,920,006 | 1/1960 | Yutema et al. | 117—106 X |
| 2,934,736 | 4/1960 | Davis | 338—308 |
| 2,935,717 | 5/1960 | Solow | 338—308 |
| 2,959,499 | 11/1960 | Herczog et al. | 117—229 |
| 2,961,352 | 11/1960 | Grattidge et al. | 117—229 |
| 2,986,481 | 5/1961 | Gudmundsen | 148—179 |
| 3,009,840 | 11/1961 | Emeis | 148—179 |
| 3,137,597 | 6/1964 | Patalong et al. | 148—185 X |

RICHARD M. WOOD, *Primary Examiner.*

RAY K. WINDHAM, *Examiner.*

H. T. POWELL, V. Y. MAYEWSKY, *Assistant Examiners.*